United States Patent
Lai et al.

(10) Patent No.: US 10,180,930 B2
(45) Date of Patent: Jan. 15, 2019

(54) AUTO COMPLETING DOMAIN NAMES COMPRISING MULTIPLE LANGUAGES

(71) Applicant: Go Daddy Operating Company, LLC, Scottsdale, AZ (US)

(72) Inventors: Wei-Cheng Lai, Cupertino, CA (US); Yang Zhao, Sunnyvale, CA (US)

(73) Assignee: Go Daddy Operating Company, Inc., Scottsdale, AZ (US)

( * ) Notice: Subject to any disclaimer, the term of this patent is extended or adjusted under 35 U.S.C. 154(b) by 244 days.

(21) Appl. No.: 15/151,293

(22) Filed: May 10, 2016

(65) Prior Publication Data

US 2017/0331783 A1 Nov. 16, 2017

(51) Int. Cl.
*G06F 17/22* (2006.01)
*H04L 29/08* (2006.01)
*G06F 17/28* (2006.01)
*H04L 29/12* (2006.01)

(52) U.S. Cl.
CPC ........ *G06F 17/2217* (2013.01); *G06F 17/289* (2013.01); *H04L 61/3025* (2013.01); *H04L 67/02* (2013.01); *H04L 61/302* (2013.01)

(58) Field of Classification Search
CPC ............. H04L 61/1511; G06F 17/2217; G06F 17/277; G06F 17/289
USPC .......................................................... 709/217
See application file for complete search history.

(56) References Cited

U.S. PATENT DOCUMENTS

| | | |
|---|---|---|
| 7,130,878 B2 | 10/2006 | Parsons et al. |
| 7,188,138 B1 | 3/2007 | Schneider |
| 7,596,515 B2 | 9/2009 | Eckel, Jr. |
| 8,046,693 B2 | 10/2011 | Oliver |
| 2002/0065903 A1 | 5/2002 | Fellman |
| 2002/0103820 A1 | 8/2002 | Cartmell et al. |
| 2003/0036898 A1 | 2/2003 | Duan et al. |
| 2003/0115040 A1 | 6/2003 | Xing |
| 2004/0015584 A1 | 1/2004 | Cartmell et al. |
| 2005/0172031 A1 | 8/2005 | Adelman |
| 2005/0289463 A1 | 12/2005 | Wu et al. |
| 2006/0015942 A1 | 1/2006 | Judge et al. |
| 2006/0074628 A1 | 4/2006 | Elbaz et al. |
| 2007/0208869 A1* | 9/2007 | Adelman ............. G06Q 10/107 709/229 |
| 2008/0235383 A1 | 9/2008 | Schneider |
| 2010/0042603 A1 | 2/2010 | Smyros et al. |
| 2012/0035914 A1 | 2/2012 | Brun |
| 2012/0066773 A1 | 3/2012 | Weisberger |
| 2012/0117095 A1 | 5/2012 | Chavvakula et al. |
| 2013/0132064 A1* | 5/2013 | Hwang ............... G06F 17/2818 704/2 |

(Continued)

*Primary Examiner* — Taylor A Elfervig
*Assistant Examiner* — Oluwatosin M Gidado
(74) *Attorney, Agent, or Firm* — Quarles & Brady LLP

(57) ABSTRACT

Systems and methods of the present invention provide for one or more server computers communicatively coupled to a network and configured to: monitor a character stream; identify characters comprising a domain name request; identify a token in a language character map comprising the characters and associated with a language; generate, using a software translation engine, a translation of the first token into a second language; generate candidate domain names comprising: a domain name comprising the token; and a second domain name comprising the second token; modify, in real time, a user interface control to display the list of candidate domain names.

12 Claims, 8 Drawing Sheets

(56) References Cited

U.S. PATENT DOCUMENTS

| | | |
|---|---|---|
| 2015/0039599 A1 | 2/2015 | Carroll et al. |
| 2015/0106690 A1* | 4/2015 | Kamdar ............. G06Q 30/0641 |
| | | 715/234 |
| 2017/0195286 A1* | 7/2017 | Stahura ............... H04L 61/1511 |

* cited by examiner

AUTO COMPLETING DOMAIN NAMES COMPRISING MULTIPLE LANGUAGES

FIELD OF THE INVENTION

The present invention generally relates to the field of Domain Name registration and specifically to the field of generating, and validating the characters and tokens within, a list of suggested candidate domain names.

SUMMARY OF THE INVENTION

The present invention provides systems and methods comprising one or more server computers communicatively coupled to a network and including instructions, that when executed by a processor running on the one or more server computers, cause the one or more server computers to: create a data table of characters, where each character in the data table is assigned a false Boolean value; for each character found in each domain name in a DNS file, update the Boolean value to true; receive a domain search request comprising a token and a TLD; generate candidate domain names using the token and the TLD; query the database to determine if any character in the domain name has the false Boolean value in the data table; and if so, remove the domain name from the candidate domain names.

In other embodiments, the present invention provides systems and methods comprising one or more server computers communicatively coupled to a network and including instructions, that when executed by a processor running on the one or more server computers, cause the one or more server computers to: receive a domain name request comprising a token and a TLD; identify a language of the token in a language map; generate candidate domain names in the language using the token and TLD; if at least of the candidate domain names comprising the TLD cannot be registered: generate, using a translation software engine, a translation of the first token into a second language; generate an alternative domain name comprising the second token and the TLD; and transmit the alternative domain name to the client computer.

In other embodiments, the present invention provides systems and methods comprising one or more server computers communicatively coupled to a network and including instructions, that when executed by a processor running on the one or more server computers, cause the one or more server computers to: monitor a character stream; identify characters comprising a domain name request; identify a token in a language character map comprising the characters and associated with a language; generate, using a software translation engine, a translation of the first token into a second language; generate candidate domain names comprising: a domain name comprising the token; and a second domain name comprising the second token; modify, in real time, a user interface control to display the list of candidate domain names.

The above features and advantages of the present invention will be better understood from the following detailed description taken in conjunction with the accompanying drawings.

DETAILED DESCRIPTION

Figure 1:
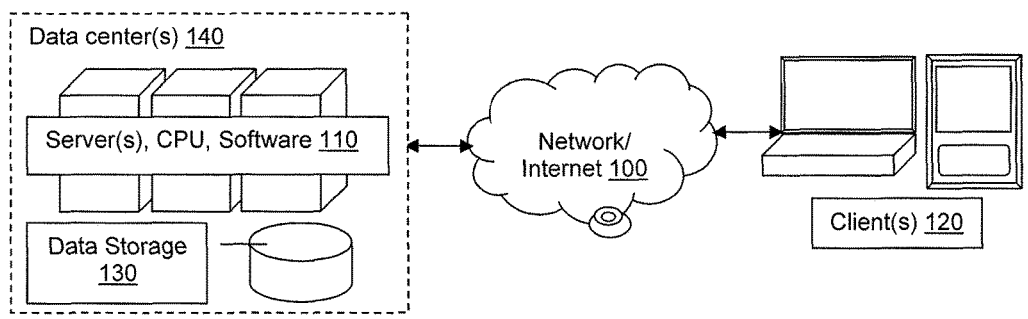
FIG. 1 illustrates a possible system for generating, verifying character sets, and/or auto-completing suggested domain names for a plurality of languages.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single web-page, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

The Domain Name System (DNS) is the world's largest distributed computing system that enables access to any resource in the Internet by translating user-friendly domain names to IP Addresses. The Internet maintains two principal namespaces: the domain name hierarchy and the IP address system. The DNS maintains the domain namespace and provides translation services between these two namespaces.

The process of translating domain names to IP Addresses is called name resolution. A DNS name resolution is the first step in the majority of Internet transactions. This DNS provides name resolution service through a family of servers called domain name servers. The DNS resolution takes place transparently in response to a sent resolution request within applications such as web browsers, e-mail clients, and other Internet applications residing in a local operating system. These applications handle the required communications.

The authoritative data needed for performing the name resolution service is contained in a file called the zone file. A zone file for the domain name example.com is seen in FIG. 1. The hierarchical domain space is divided into administrative units called zones, and a zone usually consists of a domain (e.g., example.com) and possibly one or more sub domains or other tertiary domain names (e.g., projects.example.com, services.example.com). As used in this specification, a domain name may comprise a second level domain (SLD) concatenated to a domain name (e.g., example.com), and a sub domain or tertiary domain may comprise any domains beyond the SLD (e.g., spreadsheet.example.com, columns.spreadsheet.example.com, etc.)

A DNS file may comprise any configuration file used to configure the DNS for a specific domain name, website, email, etc. DNS configuration files, such as zone files for specific domain names or sub domains, may be used to configure the DNS for a specific domain name, website, email, etc. within zones, and the authoritative name servers within the DNS may host the respective zone files for that zone. Zone files may include a collection of DNS records such as resource records. A resource record is the basic data element in the DNS, and each resource record has a type, examples of which include address records (A, AAAA), name server records (NS), and mail exchanger records (MX) for a domain name. Each record may also include an expiration time limit, a class, and some type-specific data. Each record may also include various fields, such as NAME (a fully qualified domain name of the node in the hierarchy tree), TYPE (format of data for intended use, e.g., NS or MX servers), RDATA (e.g., IP addresses for address records), CLASS (e.g., IN for internet), etc. Resource records of the same type define a resource record set.

Users may desire to register new domain names. To accomplish this, these users may, for example, access a website for a domain name registrar. Such a website may include a form allowing the user to determine the availability of the desired domain name by entering the desired domain name, or the terms that make up the domain name, into an electronic form. The registrar may search the appropriate domain names in the DNS, and determine if they are available. If not, alternative candidate domain names may be presented to the user. The process of generating alternate domain names is often referred to as domain name spinning.

The current process for generating the candidate domain names includes only a determination of the availability of the generated candidate domain names. For example, software running on the registrar's servers may access the appropriate zone files to determine if a candidate domain name, as an alternative to the user's desired domain name, is listed as a registered domain name within the zone file. If the candidate domain name is not listed among the registered domain names in the zone file, the software determines that the candidate domain name is available for registration and presents the candidate domain name, possibly included in a list of candidate domain names, to the user.

Generally, the domain name spinning process will generate candidate domain names including various combinations of different characters. Sometimes, these combinations may include characters (e.g., letters) from different languages or character sets. For some top level domains, however, certain characters may be not allowed within a single domain name. However, in the current state of the art, there is no mechanism to determine whether the combination of characters in a particular candidate domain name is authorized for registration. Without such a mechanism and validation of the combinations of characters, the software on the registrar's servers may generate the list of candidate domain names based on the user's request, present the list of candidate domain names to the user, receive a domain name selection from the user, and attempt to register the domain name with the appropriate registry, only to receive an error notification that the domain name cannot be registered due to an invalid combination of characters in the selected domain name.

To overcome this scenario, and avoid the resulting frustration to the user, the disclosed invention analyzes the zone files for all TLDs, as well as the languages represented within them in some embodiments, to determine all possible combinations of characters used in previously registered domain names for each TLD and/or language represented in the zone file.

Servers in the disclosed system store the results of this analysis within a domain name character data table, described herein. This domain name character data table includes, for each TLD and/or language, a data record comprising a representation, possibly as a data field, of each of the characters identified within the analyzed zone files. Each representation of the characters is assigned a negative Boolean value by default, such as FALSE or 0. For each character identified in the analysis of the zone file, the associated TLD and/or language may be identified, and the data record for the representation of that character, as associated with the appropriate TLD and/or language data record, may be updated to a positive Boolean value, such as TRUE or 1 to reflect the verification of existence of the character within the zone file for the appropriate TLD and/or language.

As the registrar receives the user's request for the desired domain name, including a TLD and an SLD text string and/or individual tokens/terms, the registrar's servers generate the available candidate domain names, and compare each of the characters in each of the candidate domain names with the appropriate TLD and/or language data record in the domain name character data table. If no data record is found where all characters within the requested domain name reflect a positive Boolean value (i.e., all the characters are authorized for use in a domain name), the candidate domain name containing those characters may be removed from the list of candidate domain names.

This verification of previously used characters combinations may also include a security component. For example, unscrupulous individuals may attempt to send phishing emails (which attempt to extract sensitive user information by deception) using a seemingly valid email address. However, the sender of the phishing email may use a domain name with a combination of characters in different languages that appear to be characters from a single language, in order to mimic a valid domain name. By identifying and/or preventing such domain names with multilingual combination of characters, phishing scams may likewise be avoided.

In addition to verifying that the combinations of characters in candidate domain names are verified according to previously registered domain names, the disclosed invention also provides a broader range of available candidate domain names. For example, a user may request a domain name specifying tokens, a TLD and/or a language. However, the number of candidate domain names combining the tokens, TLD and/or language may be very limited. To augment the number of available candidate domain names, the disclosed invention replaces tokens within the desired and/or candidate domain names with equivalent (e.g., translated) tokens in one or more additional languages with a greater selection of available candidate domain names.

Further, to improve the efficiency of the presentation of these additional candidate domain names, the registrar's servers may detect the characters entered by a user into a domain name request user interface control (e.g., the domain name search text box/drop down seen in FIG. 8, described in more detail below), generate the candidate domain names in real time, and modify the user interface control to display the candidate domain names. The display may also include additional user interface controls to display the candidate domain names using combinations of additional languages.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120. The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks. At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight. The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

Data storage 130 may be communicatively coupled to the network 100 and may include any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition. Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed. In the current disclosure, reference to server(s) 110 may include any of the hardware or software disclosed herein.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program such as GODADDY's MY ACCOUNT control panel for management of hosting and domain names, as a non-limiting example. In such an administration control panel program, or admin, each user may be assigned a user id. This user id may identify transactions performed by each user. These transactions may be stored as data records in data storage 130, each data record including the user id to associate the user with the transaction in data storage 130.

For example, in the context of the current invention, a collection of data records in data storage may comprise a user profile, associated with the user id, which define the user's native language or location, from which the user's native language may be extrapolated. The user's language and location may be determined from, for example, a web page or browser setting allowing the user to set the user's language or location, an IP address defining the user's location, a TLD that implies a user's preferred language, etc.

As described in detail below, the disclosed system analyzes a pool of domain names within a DNS record, such as a zone file, to identify all of the characters used in combination with each represented TLD. Because the characters have all been included in previously-registered domain names, the characters are presumed to be valid characters for use in a domain name. As candidate domain names are generated, the disclosed system determines whether combinations of characters associated with a particular TLD in the candidate domain names are valid combinations.

In order to make this determination, the disclosed system compares the combination of characters in the candidate domain names with a domain name character table 200. The records within the domain name character table 220 are generated during the analysis of the pool of domain names within the zone file. Each data record may include a TLD, and possibly an identified language. Each domain name in the pool of domain names has been registered and is therefore valid, so each of the characters within the domain name may be added to the data record reflecting the TLD/language within the domain name character data table 200 (if not already existing), and updated to reflect a positive Boolean value (e.g., TRUE, 1).

For example, the following is a non-limiting example demonstrating the domain name character data table 200, and example data records generated from the analysis of the zone file, and the TLDs, languages, identified characters and Boolean values assigned to each of the characters after analysis of the domain names résuméfaçade.com, guitarstore.com, bellefaçades.fr, beautifulillusions.com, whitehouse.us, casablanca.es, and maisonblanche.fr:

| TLD  | Language | a | @ | b | c | ç | d | e | é | f | g | h | i | l | m | n | o | r | s | $ | t | u | v | ... |
|------|----------|---|---|---|---|---|---|---|---|---|---|---|---|---|---|---|---|---|---|---|---|---|---|-----|
| .com | French   | 1 | 0 | 0 | 0 | 1 | 1 | 1 | 1 | 1 | 0 | 0 | 0 | 0 | 1 | 0 | 0 | 1 | 1 | 0 | 0 | 1 | 0 | ... |
| .fr  | French   | 1 | 0 | 1 | 1 | 1 | 1 | 1 | 0 | 1 | 0 | 1 | 1 | 1 | 1 | 1 | 1 | 0 | 1 | 0 | 0 | 0 | 0 | ... |
| .es  | Spanish  | 1 | 0 | 1 | 1 | 0 | 0 | 0 | 0 | 0 | 0 | 0 | 0 | 0 | 0 | 1 | 0 | 1 | 0 | 0 | 0 | 0 | 0 | ... |
| .com | English  | 1 | 0 | 1 | 0 | 0 | 0 | 1 | 0 | 1 | 1 | 0 | 1 | 1 | 0 | 1 | 1 | 1 | 1 | 0 | 1 | 1 | 0 | ... |
| .us  | English  | 0 | 0 | 0 | 0 | 0 | 0 | 1 | 0 | 0 | 0 | 1 | 1 | 0 | 0 | 0 | 1 | 0 | 1 | 0 | 1 | 1 | 1 | ... |

Figure 3:
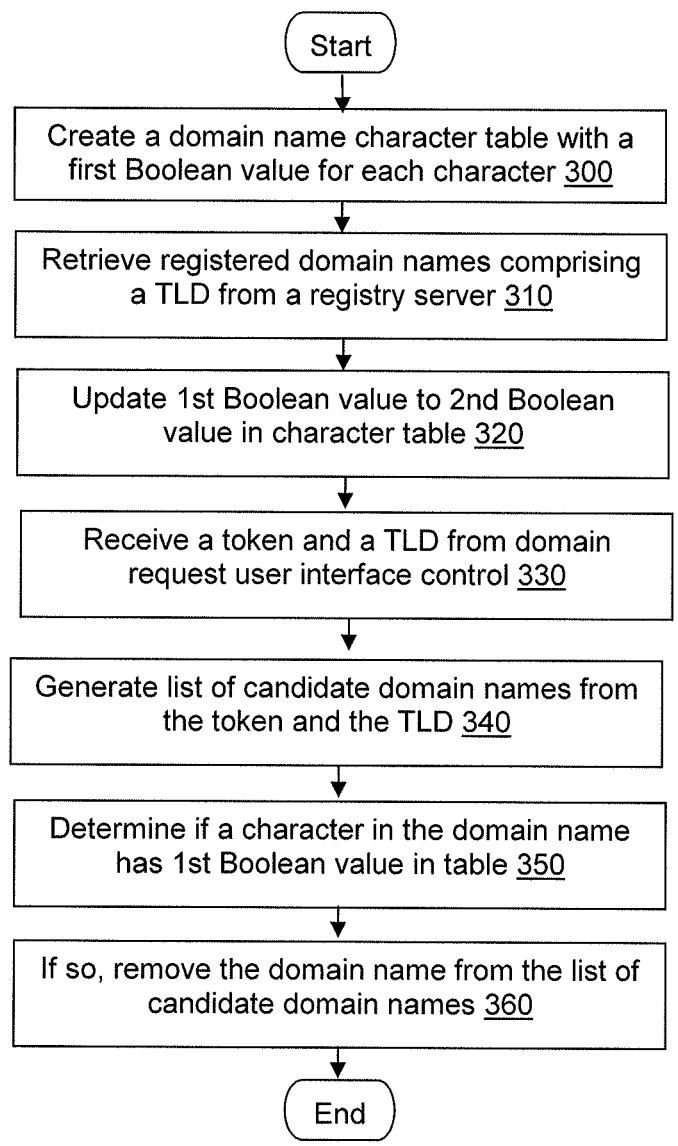
FIG. 3 is a flow diagram illustrating a possible embodiment of generating, verifying character sets, and/or auto-completing suggested domain names for a plurality of languages.

FIG. 3 demonstrates a flow diagram representing an embodiment in which the disclosed system verifies the characters within generated candidate domain names. In this embodiment, instructions are executed by one or more processors on one or more server computers 110 coupled to an electronic network 100. In step 300, server(s) 110 query a database 130 coupled to the network to create a domain name character data table 200 comprising a plurality of characters, and a first Boolean value for each of the plurality of characters.

In step 310, server(s) access a DNS server to retrieve a plurality of registered domain names comprising a top level domain (TLD). In step 320, for each of the characters in each of the plurality of registered domain names, server(s) 110 update, within the domain name character data table 200, the first Boolean value (e.g. 0, FALSE), to a second Boolean value (e.g., 1, TRUE).

In step 330, sever(s) 110 decode a transmission comprising a token and the TLD, and received from a domain request user interface control displayed on a client computer coupled to the network. In response, in step 340, server(s) 110 generate a list of candidate domain names, using the token and the TLD.

The following loop repeats for each domain name in the list of candidate domain names: In step 350, server(s) 110 query the database to determine if at least one character in the domain name comprises the first Boolean value in the domain name character data table (e.g., 0, FALSE); and in step 360, responsive to a determination that the at least one character comprises the first Boolean value in the domain name character data table, remove the domain name from the list of candidate domain names.

As noted above, in addition to verifying characters used in candidate domain names, the disclosed system may also generate candidate domain names, and display one or more candidate domain names to the user in response to the user entering multiple characters into a user interface control, such as a text box. Each of these features relies on a language character map 205 and/or a language map 220, as described in more detail below.

Data storage 130 may store, for each of the languages 1-n represented by the disclosed system, one or more language character maps 205. The language character maps 205 may include, for each of the languages 1-n, one or more data records, data tables and/or databases defining valid characters used within that language, as well as valid combinations of the characters making up terms or tokens used in the language 210.

The language character maps may further comprise a plurality of rules 215 defining characters that can and cannot be co-mingled according to the rules. As non-limiting examples, many languages that do not include Roman or Latin-based characters (Romanized characters), or that include specialized Romanized characters (e.g., ç, è, é, etc.), may be combined with Romanized characters within domain names for multiple available domain names for specific TLDs (e.g., résuméfaçade.fr). However, rules 215 within the language character maps 205 may define certain languages, such as Cyrillic, which should not be co-mingled with Romanized languages, or non-Romanized languages such as Asian or Arabic languages. For example, a non-limiting example of the rules may appear as follows:

| Language | Valid Language Character Combinations | Invalid Languages |
|----------|---------------------------------------|-------------------|
| French   | Chinese, Arabic, Spanish, Italian, English . . . | Cyrillic |
| Chinese  | Arabic, French, Spanish, Italian, English . . . | Cyrillic |
| Cyrillic |                                       | Arabic, French, Spanish . . . |

Data storage 130 may also store, for each of the languages 1-n represented by the disclosed system, one or more language maps 220. The language maps 220 may include, for each of the languages 1-n, one or more data records, data tables and/or databases defining: valid terms or tokens (e.g., made up of the characters in the language character map for the language); a part of speech represented by each term or token in the language (e.g., an article, noun (and the noun's gender, where applicable), adjective, verb, adverb, conjunction etc.); reference to one or more equivalent terms or tokens in one or more additional languages for interpretation and/or translation purposes (e.g., database joins and/or data fields connecting equivalent terms or tokens between data tables for various diverse languages); and/or proper nouns, idiomatic terms, specialized (e.g., industry specific) terms, user-created terms, terms identified from a web crawls, etc. 225. The language maps 220 for each of the languages 1-n may further comprise a grammar rules reference 230 for the language (e.g., defining rules for plural/gender agreement between, as well as order of, each of the parts of speech for the terms or tokens). For example, a non-limiting example of a French language map may appear as follows:

| Token | Part of Speech (grammar) | Gender | English Translation | ... |
|---|---|---|---|---|
| maison | noun (la) | feminine | house | ... |
| blanche | adjective (after noun) | feminine | white | ... |

Using the characters from each of the languages represented in the character language maps 205 and/or language maps 220, server(s) 110 may query data storage 130 to generate and populate the data columns of a domain name character data table 200 configured to store the characters found in each of the languages represented in the language character map 205 and/or language map 220.

Figure 2:
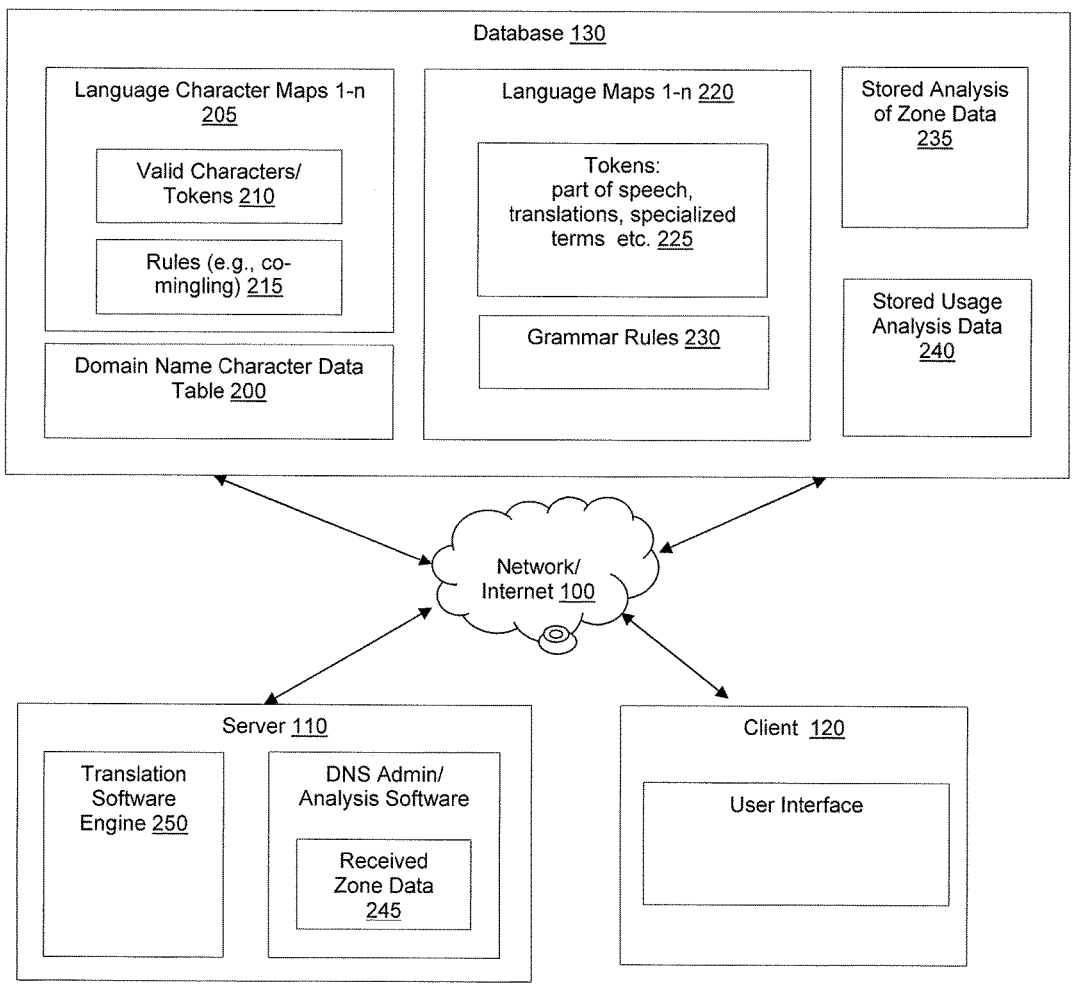
FIG. 2 illustrates a more detailed possible system for generating, verifying character sets, and/or auto-completing suggested domain names for a plurality of languages.

Although a single domain name character data table 200 is shown as a non-limiting example embodiment in FIG. 2, no limits should be placed on the database structure for the data representing the characters, TLDs and/or languages stored in the data table 200. As non-limiting examples, each data record within the data table 200 may include data fields defining a TLD, a language and/or a Boolean value, such as 1 or 0, indicating whether each of the character represented by the data column is a valid character within the TLD and/or language. Each of the characters in each data record may be set to the FALSE Boolean value (e.g., 0) by default.

In some embodiments, such as the example table above, the data table 200 may be named to reflect the TLD represented and may store data only for that particular TLD. Each of the data records in these embodiments may include a data field for the represented language, and the Boolean value for each identified character. In other embodiments, the data table 200 may be named for the language and each data record may include a data field defining a different TLD. In some embodiments, the language, TLD and Boolean values may be stored in separate data fields in separate data records in separate data tables that are associated via database join, and so on.

If the characters within the character data table 200 are determined to exist within registered domain names, as described below, the characters may be validated within the data table 200, and the Boolean value for each character in the registered domain name may be updated within the data table to reflect this validation. Server(s) 110 may verify the use of these characters in registered domain names according to available zone data from the DNS. Server(s) 110 may transmit a request (possibly an RPC to an API) to the data centers 140 operated by one or more registries in order to execute a database query to either download, select or otherwise access this available zone data 245, possibly stored within one or more zone files or other DNS data records within a DNS database at the registry. Server(s) may then analyze the zone data. For example, for each of the domain names registered with the registry, a data record may exist within the zone data 245, and each domain name within each zone file data record may be associated with a specific TLD.

For each of the registered domain names and/or data records identified in the zone data 245, server(s) 110 may identify the domain name's TLD. Server(s) 110 may then identify, within each registered domain name, a plurality of characters which make up the second level domain (SLD) of the domain name, or may alternatively also include the characters from the TLD. Server(s) 110 may then compare each character in the domain name with each language's language character map 205 and/or language map 220 to determine if each of the characters in the domain name is found within the language character map 205. For each character in the domain name found in the language character map 205, each instance of the character associated with the identified TLD may be updated to reflect a TRUE Boolean value (e.g., changed from 0 to 1 in the domain name character table 200). Thus, the disclosed system may effectively create a bit vector for each of the characters in each registered domain name, reflecting whether each character listed in the domain name character data table 200 is associated with, or not associated with, a specific TLD represented in the data record.

Server(s) 110 may store and update usage analysis data 240 related to the analyzed zone data 235. Data storage 130 may comprise one or more data records, data tables and/or databases storing a sum of a running total of usage of features determined from the analysis of each of the domain name related data records within the zone data. For example, server(s) 110 may store, within data storage 130, a running total of each identified TLD from each analyzed data record to determine a most frequently used TLD. Server(s) 110 may also store a running total of each character, and/or its associated TLD. Additional running totals may also apply, such as the total number of characters associated with a particular TLD, or characters associated with a specific language, as described below.

One or more specific languages associated with each of the domain names in the zone data 245 may be identified and/or verified in multiple ways, and may include any means of identifying a language from a text string known in the art. In some example embodiments, server(s) 110 may compare each character in each domain name in the received zone data 245 against the language character map 205. If the character is only found in a single specific language in the language character map 205, server(s) 110 may associate that character, a token associated with that character (described below) and/or the domain name including that character, with the language identified in the language character map 205.

In some example embodiments, after identifying the TLD for each domain name in the received zone data 245, server(s) 110 may determine the language associated with the domain name according to the identified TLD. For example, .us and .uk domain names are likely to be associated with the English language, .mx and .es are likely to be associated with Spanish, .fr is likely to be associated with French, .cn is likely to be associated with Chinese, and so on.

In some embodiments, server(s) 110 may determine a language associated with a domain name in the received zone data 245 by tokenizing the SLD (using any tokenization techniques known in the art) to identify terms or tokens within each domain name. In some embodiments, tokenization may include comparing each word in the language map 220, for each represented language, with the character string that makes up the SLD. Character strings within the domain name that match a term or token within the language map for a specific language may be identified as possible candidate terms or tokens used to identify a candidate language associated with the domain name.

As each token is identified, usage analysis data 240 related to the zone data 235 containing the domain name may be updated to reflect the frequency of usage of both the token itself within domain names and the language associated with the token. For example, as each character found only in a single language in the character language map is identified, the running total of usage of that character and/or language may be updated in the usage data. Similarly, for each identified token, server(s) 110 may update the usage data to reflect the most frequently occurring TLDs, languages, characters, and/or tokens.

Server(s) 110 may repeat the process for each remaining character string in the domain name, searching for matching character strings in the identified candidate language within the language map 220. If a majority of identified tokens in the domain name character string match the candidate terms or tokens of the candidate language within the language map, server(s) 110 may determine that the character strings in the domain name are characters and tokens from the identified candidate language, and update the data table 200 and/or usage analysis data 240 accordingly.

Text strings that do not match any tokens in the language map 220 for the first candidate language may be handled in multiple ways. For example, each of the characters and/or tokens within the domain name may be compared against one or more additional languages within the language character map 205 and/or language map 220, as described above for each of the character strings. If the unique characters and/or tokens are matched to a second or nth language, server(s) 110 may determine that multiple languages are represented within a single domain name.

Data storage 130 may be updated to reflect that the combination of these languages is valid according to the received zone data 245, and that the combination of the characters and tokens in these languages is valid when used in suggesting alternative candidate domain names, described in more detail below. In addition, the usage analysis data 240 may be updated to reflect a running count of the characters, tokens and/or languages being used in combination.

If server(s) 110 determine that only one language is represented, but that there are character strings within the domain name that do not match any specialized characters or tokens in any of the languages represented in the language map 220, the unidentified characters and/or strings may be associated with the first language, and may be identified as irregular characters strings, such as proper nouns, idiomatic terms, specialized terms, user-created terms, terms identified from a web crawl, or other non-standard tokens in the first language. In some embodiments, the language map 220 may be updated to include the new tokens. Server(s) 110 may therefore add the unidentified strings to the appropriate part of the language map 220 for the identified language, and test the validity of this identification according to the feedback loop described below.

In some embodiments, server(s) 110 may identify, within the domain name character string, specialized characters and/or tokens from multiple languages existing within the same domain name. In these embodiments, server(s) 110 may be configured to update the co-mingling rules 215 to specify that domain names that include the identified TLD may recommend alternative candidate domain names that include characters and/or tokens from combinations of the multiple identified languages. The usage analysis data 240 for the character strings, characters and/or tokens may likewise be updated accordingly.

In addition to identifying individual tokens within each domain name in the zone data, server(s) 110 may identify adjacent tokens within the domain name, either in the first language, or in multiple additional languages. Usage analysis data 240 may be updated to reflect the frequency that the adjacent tokens appear next to each other, the order of the adjacent tokens, and/or the languages represented by the adjacent tokens. For example, if the adjacent tokens are all in the same language, the frequency of all adjacent tokens in that single language may be incremented by 1 within the usage analysis data 240. If multiple languages are represented by the tokens, the usage analysis data 240 may be updated to increment by 1 the number of times the two (or multiple) languages have been used together, the number of times the multiple specific tokens have been used together, the order of the specific languages or specific tokens, etc. This analysis may be used in the determination of generating multi-language alternative domain name candidates, auto-completion of the domain name candidates, pidgins or phonetic scripting used in generating domain name candidates, as described below.

After each domain name within each of the zone data 245 has been analyzed, and the appropriate data records, data tables and/or databases have been created and stored within the analyzed zone data 235 and usage analysis data 240, server(s) 110 may receive, from a user via a user interface displayed on a client machine 120, a request to register a specific domain name, and/or a search to determine the availability of the domain name. In some embodiments, the user may enter the domain name itself as a single string (e.g., résuméfaçade.com). In some embodiments, the user may select a TLD for a domain name (e.g., from a drop down, checkbox, etc.), and enter a single SLD string comprising one or more keyword tokens (résumé façade). In some embodiments, the user may enter the keyword tokens and either select the TLD from a user interface control, or include it as a "keyword," etc.

Server(s) 110 may determine whether the requested domain name is available for registration, by accessing the zone data 245 for the requested domain name. If the requested domain name is not listed within the zone data 245, the domain name may be registered using any domain registration techniques known in the art. However, if the domain name is listed in the zone data 245, the requested domain name is not available for registration, and server(s) may generate a list of candidate domain names as alternatives to the requested domain name using any domain name spinning techniques known in the art.

In some embodiments, as the received zone data 245 is searched for domain name availability purposes, server(s) 110 may also update the data records, data tables and/or databases for the analyzed zone data 235 and/or usage analysis data 240, according to the techniques described above, to ensure that the stored data is current with the received zone data 245.

For each domain name in the list of candidate domain names, server(s) 110 may compare all combinations of characters within the domain name to determine if any combination of characters in the domain name is incompatible according to co-mingling rules 215 within the language character map 205. Any domain name in the list of candidate domain names that includes this co-mingling of characters may be immediately removed from the list of candidate domain names.

Continuing the rules example above, a user may request and/or search an available domain name that includes Cyrillic letters combined with Romanized, Asian and/or Arabic characters. Server(s) 110 may receive the requested domain name, generate a list of candidate domain names, and analyze each of the candidate domain names in light of the stored rules. In the example above, the rules dictate that Cyrillic characters are not compatible with Arabic, Asian and/or Romanized characters. Because the stored rules do not allow co-mingling of Cyrillic characters with Asian, Arabic or Romanized characters, server(s) 110 may remove any domain names that contain these types of co-mingling from the list of candidate domain names.

For each remaining domain name in the list of candidate domain names, server(s) 110 may identify the TLD, character set, and/or tokens in the domain name, as described above, and query the appropriate character data within the character data table to select any data record that includes a positive flag (e.g., TRUE Boolean value, 1 instead of 0, etc.) for each of the characters identified within the suggested domain name.

In some embodiments, if the database query returns no results for a data record in which the value for each of the characters in the domain name includes a positive flag, the associated domain name may be removed from the list of candidates, thereby providing only domain names with valid characters in the list of candidate domain names.

In some embodiments, the candidate domain names may be tested to verify that any co-mingled languages represented in each of the domain names are valid. Specifically, server(s) 110 may identify the languages represented within each domain name in the candidate list, as described above, and for each instance of co-mingled languages, server(s) 110 may access the analyzed zone data 235 to determine whether domain names with the two co-mingled languages existed in the received zone data 245. Each domain name in the list of candidate domain names, including languages that correspond to the co-mingled languages identified in the analyzed zone data 235, may be considered valid.

Figure 4:
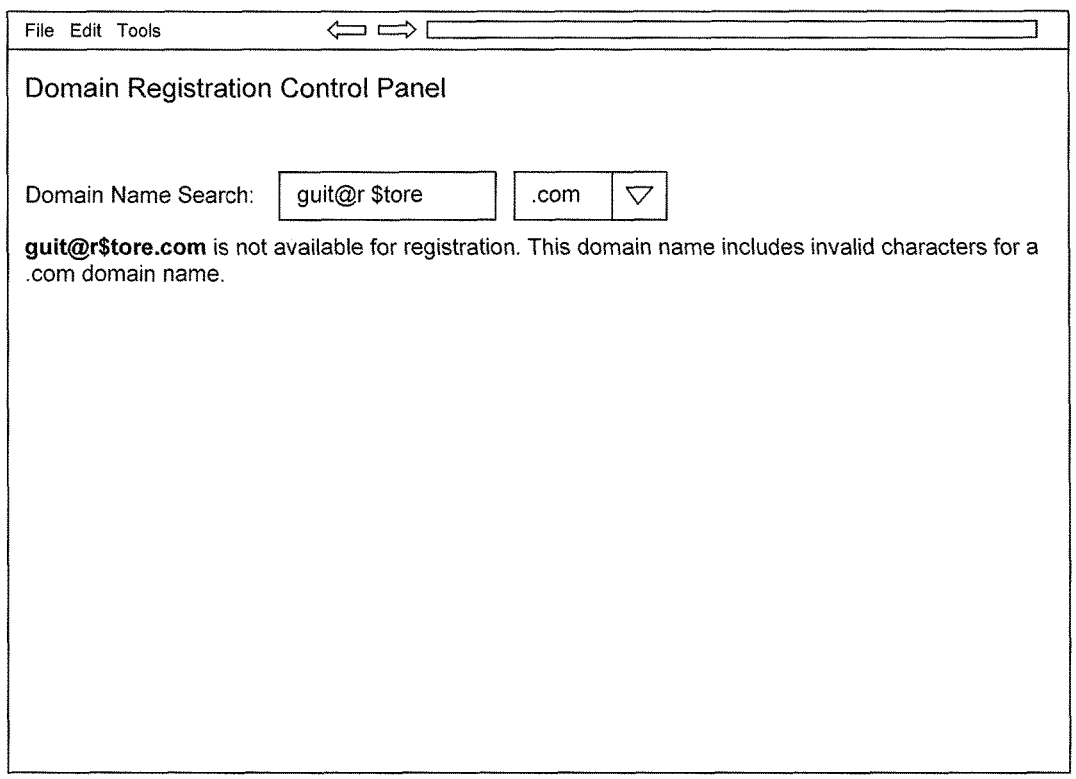
FIG. 4 is a example embodiment including a user interface used in generating, verifying character sets, and/or auto-completing suggested domain names for a plurality of languages.

FIG. 4 is a non-limiting example of a user interface designed to receive the user's selected domain name, tokens and/or TLD, determine the availability of domain names including these tokens, and verify the validity of the characters in each of the domain names in the list of candidate domain names generated in response to the user request. In this example embodiment, the user has selected a .com domain name from a dropdown list and has entered the tokens guit@r and $tore to search the availability of domain names that include these tokens.

In response, the disclosed system may compare the characters in the tokens received from the user, with the characters associated with the .com TLD (or any other TLDs in the domain name character data table) in which all of the characters from the requested tokens have a Boolean TRUE value. In this case, no records were found in which each of the characters in guit@r $tore were all Boolean TRUE values. All domain names in the list of candidate domain names were therefore removed, and a notification was displayed to the user that the character set for the requested tokens is not valid for the selected TLD.

Figure 5:
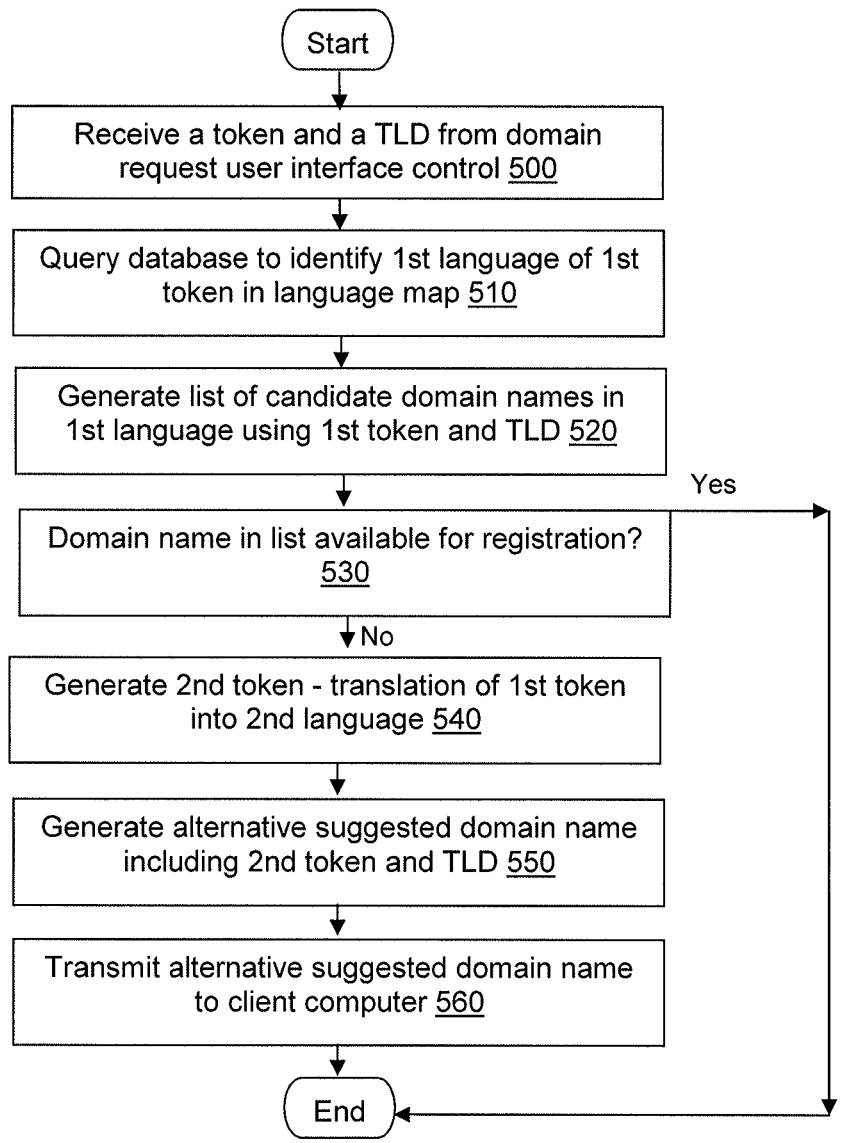
FIG. 5 is a flow diagram illustrating a possible embodiment of generating, verifying character sets, and/or auto-completing suggested domain names for a plurality of languages.

As noted above, server(s) 110 may be configured to receive a domain name request (as seen in step 330 and FIG. 3) and provide users with alternative domain names in the user's language, multiple additional languages, or any valid combination thereof. FIG. 5 demonstrates a flow diagram representing such an embodiment. In this embodiment, instructions are executed by one or more processors on one or more server computers 110 coupled to an electronic network 100. In step 500, server(s) 110 decode a transmission, received from a domain request user interface control displayed on a client computer 120 coupled to the network 100, the transmission comprising a first token and a top level domain (TLD). In step 510, server(s) query a database 130 coupled to the network to identify, within a language map 220, a first language of the first token.

In step 520, server(s) generate a list of candidate domain names in the first language, using the first token and the TLD. In step 530, responsive to a determination that at least one domain name in the list of candidate domain names comprising the TLD is not available for registration, server(s): generate, using a translation software engine 250, a second token comprising a translation of the first token into a second language (Step 540); generate an alternative suggested domain name comprising the second token and the TLD (Step 550); and transmit the alternative suggested domain name to the client computer (Step 560).

Figure 6:
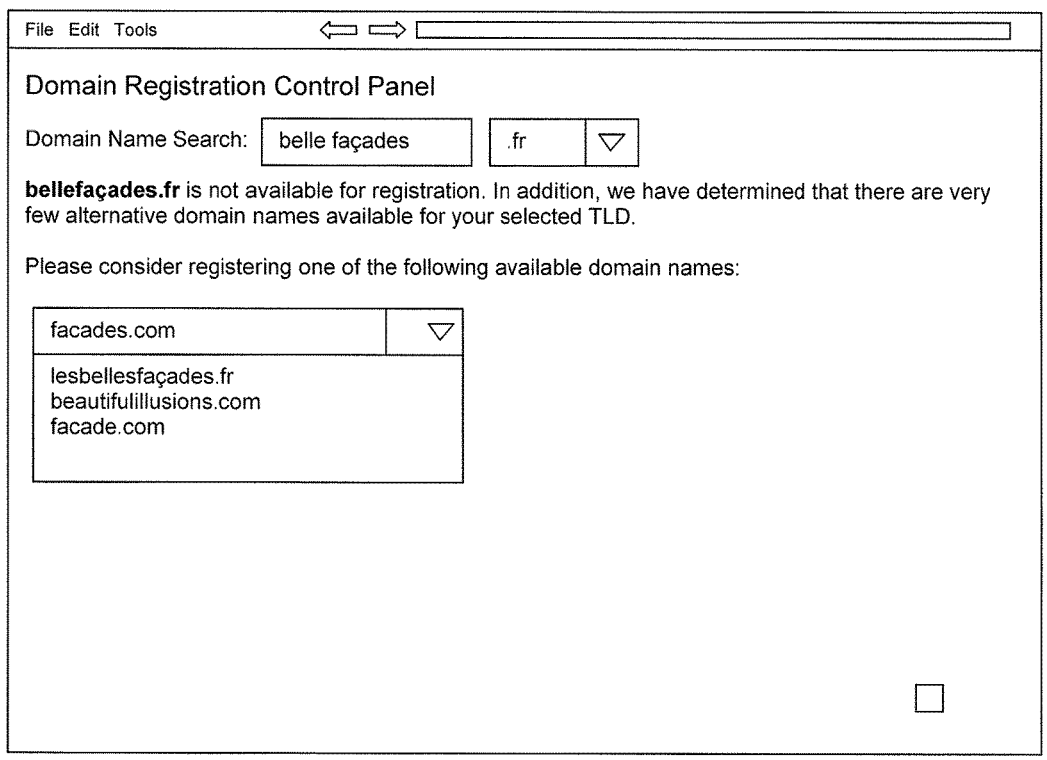
FIG. 6 is a example embodiment including a user interface used in generating, verifying character sets, and/or auto-completing suggested domain names for a plurality of languages.
Figure 7:
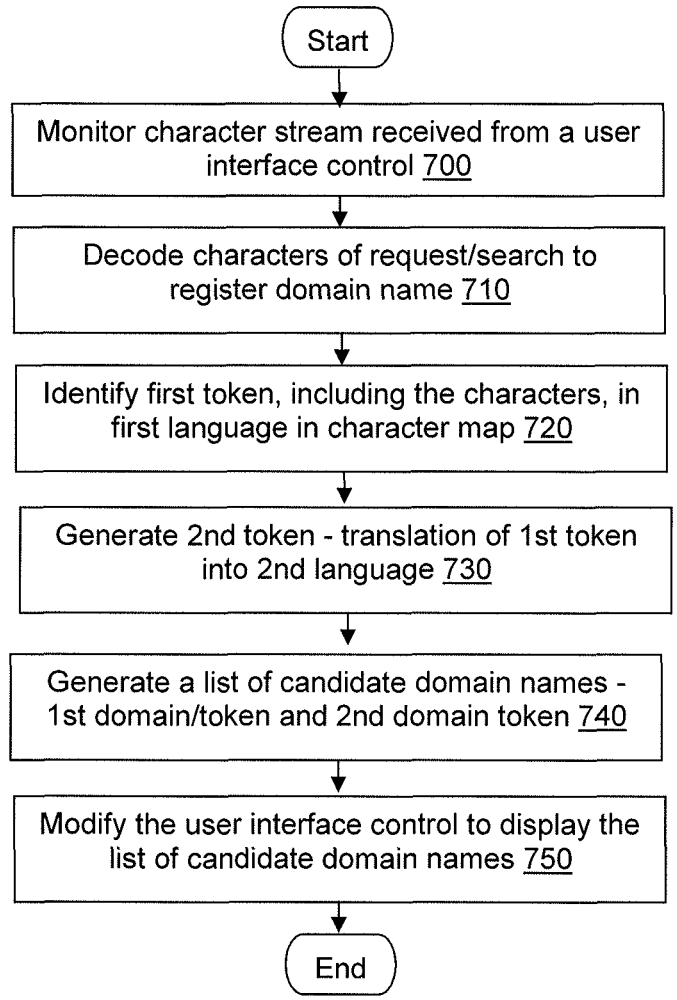
FIG. 7 is a flow diagram illustrating a possible embodiment of generating, verifying character sets, and/or auto-completing suggested domain names for a plurality of languages.

FIG. 6 is a non-limiting example user interface used to suggest alternative candidate domain names in a plurality of languages. In this example, the user has selected a .fr TLD, and has entered the French tokens "belle" and "façades" into the domain name search user interface control. After determining that the requested domain name is unavailable for registration, the disclosed system may translate the tokens into a second language and replace the tokens with the translated equivalent in a second language. Server(s) 110 may then generate a list of alternative candidate domain names, including an equivalent domain name with a translation of the tokens into a second language (e.g., beautiful as an equivalent to belle, illusions as an equivalent to the translated equivalent of façades).

In addition to the alternative suggested domain name that includes the second token generated by the translation software engine 250, the list of candidate domain names may include candidate domain names in the user's primary language. The user's language may be identified from the domain name request using any known language identification techniques, including those disclosed above (e.g., identifying language-specific characters or tokens). In addition, if the user has authenticated themselves prior to submitting the domain name request (e.g., by accessing the system via a username or password) a user profile may define a user's preferred language, identify the user's location associated with a preferred language, etc. For example, in FIG. 6, server(s) 110 may determine that the user's language is French based on the selected domain name and tokens.

Once the user's primary language has been identified, server(s) 110 may generate the list of alternative candidate SLDs for domain names in the user's primary language. In addition to using techniques for generating alternative candidate domain names as known in the art, server(s) 110 may perform an interpretation construction on the SLD within the candidate domain names, to ensure that interpretation of each of the candidate domain names in the user's primary language is accurate according to the grammar for the language.

For example, server(s) 110 may access the grammar rules 230 within the language map 220, tokenize each of the candidate domain name SLDs, and edit the tokens, and/or the order of the tokens, in order to adhere with the language's proper usage, such as agreement between articles, nouns, gender, verbs, etc. (e.g., in French, l' where the following token begins with vowel), and proper order of nouns, adjectives, adverbs, etc. For example, in FIG. 6, server(s) 110 may use interpretation construction to generate the suggested alternative domain name lesbellesfaçades.fr, based on the grammar rules for article, agreement and order as stored in the language character maps 205 and/or language maps 220.

After performing interpretation construction on the candidate domain names in the user's primary language to ensure proper grammar, the candidate domain names may be ranked according to the most frequently used features (e.g., TLD, characters, tokens, etc.), as reflected in the usage analysis data 240.

Once agreement and proper grammatical construction has been confirmed, and the candidate domain name SLDs have been ranked accordingly, server(s) 110 may combine the SLD for each of the candidate domain names with the user's requested TLD, or a most frequently used TLD according to the usage analysis data 240. However, for some TLDs, the available domain names that include characters, tokens, etc. in the user's language may be extremely limited when combined with the user's requested and/or preferred TLD. If the user indicates through the user interface that their preference is for the domain name to include this TLD, the disclosed system may augment the available candidate domain names by: replacing tokens in the candidate domain names (in the user's primary language) with tokens in one or more secondary languages, in order to present the user a broader range of candidate domain names with the desired TLD (e.g., beautifulillusions.com in FIG. 6). The disclosed system may also augment the available candidate domain names by replacing and/or transliterating characters in the candidate domain name with characters in the one or more secondary languages (e.g., facades.com and facade.com in FIG. 6). The candidate domain names may therefore include pidgin domain names. In other words, the domain names may reflect a pidgin, meaning a mixture of two languages or a simplified primary language with other languages' elements included.

To generate such pidgin domain names, each domain name in the list of candidate domain names may be tokenized, and each token in the domain name identified by attempting to match tokens in the language map 220 with character strings in the candidate domain name, according to the techniques disclosed above. Server(s) 110 may analyze the usage analysis data 235 in order to determine the most frequently used TLD that includes usage of the desired language, and therefore the greatest likelihood of available candidate domain names.

In addition, in some embodiments, server(s) 110 may query and analyze the usage analysis data 240 to identify the most frequent language that is co-mingled with the user's primary language, and preferably which includes the desired TLD. In other embodiments, the user may have requested a domain name that includes tokens from additional languages, and the generation of the candidate domain names may be initialized by replacing characters and tokens from the one or more secondary languages.

Using the identified secondary language, server(s) 110 may replace tokens in the SLD of the candidate domain name with tokens in the secondary language. In some embodiments, tokens may be replaced by the closest translation of tokens in the secondary language, according to the translation relationships 225 within the language map 220. In some embodiments, server(s) 110 may determine the tokens to replace existing tokens in the SLD according to the most frequently used tokens identified from the stored zone data 235. The translated list of candidate domain names may then be transmitted to the client computer 120.

In some embodiments, server(s) 110 may concatenate one or more additional tokens to the tokens in the domain name candidates, based on the adjacent token data in the stored zone 235 and usage 240 data. In embodiments where multiple domain names are available in the user's primary language for the user's selected TLD, the candidate domain names may include the most frequent adjacent tokens in that language according to the stored zone 235 and usage 240 data. In embodiments where translated tokens in one or more languages are required (e.g., lack of sufficient candidate domains for TLD, user co-mingles languages in requested domain, etc.), the adjacent tokens may be concatenated in the primary language or may be translated into the most frequently used language for translation according to the stored zone 235 and usage 240 data.

In embodiments where the pidgin domain names include individually replaced characters in the candidate domain names, server(s) 110 may accomplish the replacement/transliteration of the characters by removing any specialized characters from the candidate domain names, and replacing the specialized characters with a more frequently used character (e.g., resumefacade.com replaces résuméfaçade-.com), creating a type of character-level pidgin domain name and a greater range of available domain name candidates within the user's preferred TLD.

In some embodiments, such as where the generated SLDs have very few candidate domain names in the user's primary language for the user's preferred TLD, server(s) 110 may utilize phonetic scripts to generate alternative candidate domain names. As a non-limiting example, pinyin is the phonetic script representing the official phonetic system for transcribing mandarin characters to their equivalent phonetic sound in English. If the user's preferred TLD does not have sufficient available domain names using the mandarin characters, the disclosed system may translate the original domain name into its pinyin equivalent to provide the user with a broader range of available domain names using the preferred TLD.

Additional techniques may be applied to this phonetic script translation. In one example, compaction may be performed. This compaction may comprise converting the foreign tokens or characters into the phonetic script (pinyin, in the example above), and using the first letter of each pinyin word, concatenated together with the user's selected TLD, to generate a candidate domain name.

In some embodiments, the phonetic sound in the original language may be used to identify homonyms in another language, and these homonyms may be substituted for the original characters or tokens to generate candidate domain names for the user's selected TLD. As a non-limiting example, some words/characters in Chinese sound like the same word designating a particular number. As such, the candidate domain names may include numbers instead of corresponding words, thereby generating candidate domain names by replacing the equivalent character or token with the equivalent numbers.

Once the list of candidate domain names has been interpreted in the user's primary language, and/or tokens in the domain names have been translated into a secondary language, server(s) 110 may rank the candidate domain names. The candidate domain names in the user's primary language may be ranked according to the TLDs and/or keywords in the candidate domain names, according to the stored data for existing zone files or prior searches 235, 240.

The full list of candidate domain names may also be ranked according to several factors. Candidate domain names may be ranked higher according to term overlaps and a lower instance of modified characters when comparing the requested domain name and the candidate domain name. The popularity of the TLD for a particular market may also rank a particular candidate domain name higher in the list. The price of each candidate domain name may also be a factor in its ranking in the list. Shorter domain names (e.g., fewer tokens in the SLD) may rank higher than longer domain names in the list. Finally, the list of candidate domain names may be personalized according to the user profile for the user (e.g., user's preferred TLDs, domain name characteristics in the user's domain name portfolio), with domain names closer to the user preferences being ranked higher in the list.

Once the domain names in the list of candidate domain names has been updated and ranked, the list of candidate domain names may then be transmitted to the client for display, as seen in FIG. 6. The user may select one or more of the candidate domain names via a user interface, and server(s) 110 may register the domain name(s).

As noted above, as users enter one or more tokens and a TLD to request a domain name, server(s) 110 may be configured to auto-complete the users request with at least one candidate domain name. FIG. 4 demonstrates a flow diagram representing such an embodiment. In this embodiment, instructions are executed by one or more processors on one or more server computers 110 coupled to an electronic network 100. In step 700, server(s) 110 monitor a character stream, received from a first user interface control displayed on a client computer 120 coupled to the network 100, and in step 710, decode, within the character stream, a plurality of characters comprising a request to search or register a domain name.

In step 720, server(s) 110 query a database 100, coupled to the network, to identify, within a language character map 205, a first token comprising the plurality of characters and associated in the language character map 205 with a first language. In step 730, server(s) 110 generate, using a software translation engine, a second token comprising a translation of the first token into a second language, and in step 740, server(s) 110 generate a list of candidate domain names comprising: a first domain name comprising the first token; and a second domain name comprising the second token. In step 750, server(s) 110 modify, in real time, the user interface control to display the list of candidate domain names.

Server(s) 110 may monitor the character stream to anticipate the domain name or keywords, determine if the domain name is available for registration, and if not, generate, in real time, an auto-completed candidate domain name, which may be transmitted to the client computer to modify the content of the user interface control.

As the user begins to enter the domain name search into the user interface control, the user's client machine 120 may transmit, as a character stream, each entered character, and/or the combination of characters as each new character is received. Server(s) 100 may monitor the character stream in anticipation of a domain name string or keywords, and receive the character stream as characters from the user interface control on the client computer 120.

Server(s) 110 may then decode the plurality of characters within the character stream, and query the language character map 205 and/or language map 220 to identify one or more tokens that include the received characters. Each of the identified tokens may be associated in the language character map 205 and/or the language map 220 with a language. In some embodiments, if more than one token is found matching the received characters, server(s) 110 may query the stored zone file 235 and usage 240 data to determine the most frequently used tokens that match the received characters.

Server(s) 110 may then use the identified token(s) to generate a list of candidate domain names, using any of the techniques for generating candidate domain names disclosed herein or known in the art. In some embodiments, if the user specified a preferred TLD prior to typing the character stream, server(s) 110 may generate the candidate domain names which include the TLD. If the user did not specify a preferred TLD prior to typing the characters, server(s) 110 may generate candidate domain names which includes the most frequently used TLD in conjunction with the identified token. Server(s) 110 may then access the appropriate zone data 245 to determine if the domain names are available for registration, as described above. If not, those candidate domain names may be removed from the list.

Server(s) 110 may then transmit one or more of the domain names in the list of candidate domain names to the client computer for real-time display, modifying the user interface control that received the character stream to display the one or more candidate domain names. In embodiments that only allow one domain to be displayed, the highest ranking domain may be displayed in the user interface control, according to the ranking algorithms disclosed above.

If the user registers the domain name, the process ends. However, in some embodiments, if the user indicates that they want to refine the domain name, either through explicit request or by pausing for a pre-determined period of time, server(s) 110 may determine the most frequent adjacent tokens, according to the techniques described above, and automatically concatenate these tokens to the domain name displayed in the modified user interface control.

In some embodiments, server(s) 110 may identify the most likely tokens being input by the user, according to the method steps above, as well as the language associated with each token, and access translation data within the language character map 205 and/or language map 220, identifying translations of each token from the associated language into one or more additional languages within the language character map 205 and/or the language map 220. Server(s) 110 may then translate the one or more tokens, and re-generate the list of candidate domain names based on both the tokens in the original language, and additional translated tokens in one or more additional languages.

In some embodiments, the auto complete feature may utilize the phonetic scripts described above. In one non-limiting example embodiment, a user may begin by typing the character stream, comprising one or more tokens in the phonetic script, such as pinyin. Server(s) 110 may identify the phonetic script, and automatically generate an auto-completed candidate domain name in the origin language. Using the example above, server(s) 110 may identify a pinyin token from the character stream, and provide one or more candidate domain names including Chinese characters or phrases based on the pinyin input. The candidate domain name(s) displayed in the user interface control could also include any combination of the Chinese characters/phrases and English. This example is non-limiting, other pidgin languages may be also be combined in like manner.

Figure 8:
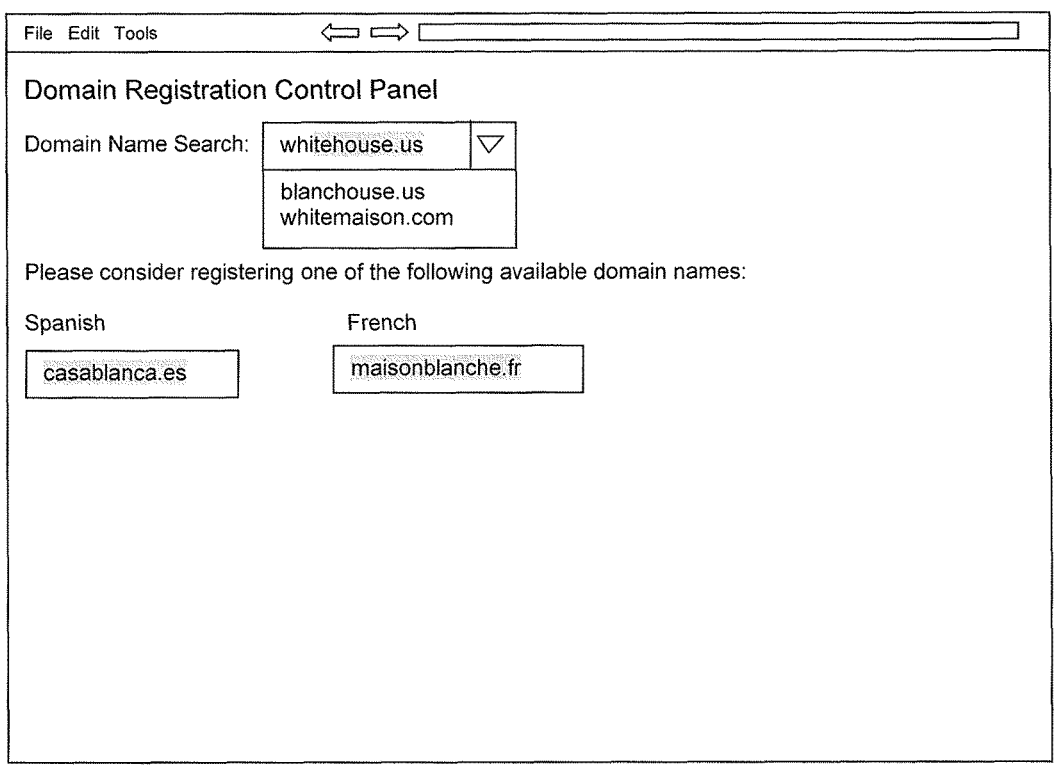
FIG. 8 is a example embodiment including a user interface used in generating, verifying character sets, and/or auto-completing suggested domain names for a plurality of languages.

FIG. 8 is a non-limiting example user interface demonstrating auto-completion of a user's requested domain name. In embodiments such as that seen in FIG. 8, the user interface may include multiple translations of the requested domain name. These translations may be displayed within one or more user interface controls, each of which represents a translation of the auto-completed original phrase.

The auto-complete feature, as well as the system generally, may include a feedback loop so that as user's make selections, the server(s) can refine the language database. Using the example of the auto-complete feature described above, the user system may generate candidate domain names to display to the user. The system may determine which of the domain names is selected, and further analyze the characters, tokens, TLDs, and other features associated with that domain name. Based on the user's feedback, as the system generates future candidate domain names, server(s)

110 may identify the preferred features, and rank candidate domain names with these features higher in the list of candidate domain names.

The steps included in the embodiments illustrated and described in relation to FIGS. 1-8 re not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising at least one processor executing instructions causing a server computer, coupled to a network, to:
   monitor a character stream, received from a user interface control displayed on a client computer coupled to the network;
   decode, within the character stream, a plurality of characters comprising a request to search or register a domain name;
   query a database, coupled to the network, to identify, within a language character map, a first token comprising the plurality of characters and associated in the language character map with a first language;
   generate, using a software translation engine, a second token comprising a translation of the first token into a second language;
   retrieve a plurality of registered domain names from a domain name system (DNS) zone file;
   identify, within the zone file, for each of a plurality of registered domain names, a plurality of tokens including the first token and the second token, and a Top Level Domain (TLD);
   store the plurality of tokens and the TLD in a database coupled to the network;
   generate a sum of a running total of:
      at least one TLD associated with each of the plurality of registered domain names;
      at least one token identified in each of the plurality of registered domain names;
      at least one language, determined by the at least one token, associated with each of the plurality of registered domain names; and
      a plurality of adjacent tokens in each of the plurality of registered domain names;
   generate a list of candidate domain names comprising:
      a first domain name comprising the first token; and
      a second domain name comprising the second token;
   modify, in real time, the user interface control to display the list of candidate domain names.

2. The system of claim 1, wherein the language character map comprises:
   a plurality of valid characters for each of a plurality of languages;
   a plurality of tokens associated in the language character map with each of the plurality of languages;
   a part of speech associated in the language character map with each of the plurality of tokens;
   a translation of each of the plurality of tokens into at least one additional language in the language map.

3. The system of claim 1, further comprising at least one additional user interface control displaying an additional candidate domain name and displayed in response to the server computer modifying the user interface control to display the list of candidate domain names.

4. The system of claim 3, wherein the additional candidate domain name is translated into at least one additional language.

5. The system of claim 1, wherein the list of candidate domain names further comprises a transliteration of at least one character in the first language into at least one character in the second language.

6. The system of claim 1, wherein the list of candidate domain names further comprises a translation of the first token or the second token into a phonetic script.

7. A method comprising the steps of:
   monitoring, by a server computer coupled to a network, a character stream, received from a user interface control displayed on a client computer coupled to the network;
   decoding, by the server computer, within the character stream, a plurality of characters comprising a request to search or register a domain name;
   querying, by the server computer, a database, coupled to the network, to identify, within a language character map, a first token comprising the plurality of characters and associated in the language character map with a first language;
   generating, by the server computer, using a software translation engine, a second token comprising a translation of the first token into a second language;
   retrieving, by the server computer, a plurality of registered domain names from a domain name system (DNS) zone file;
   identifying, by the server computer, within the zone file, for each of a plurality of registered domain names, a plurality of tokens including the first token and the second token, and a Top Level Domain (TLD); and
   storing, by the server computer, the plurality of tokens and the TLD in the database:
   generating, by the server computer, a sum of a running total of:
      at least one TLD associated with each of the plurality of registered domain names;
      at least one token identified in each of the plurality of registered domain names;
      at least one language, determined by the at least one token, associated with each of the plurality of registered domain names; and
      a plurality of adjacent tokens in each of the plurality of registered domain names;
   generating, by the server computer, a list of candidate domain names comprising:
      a first domain name comprising the first token; and
      a second domain name comprising the second token;
   modifying, by the server computer, in real time, the user interface control to display the list of candidate domain names.

8. The method of claim 7, wherein the language character map comprises:
- a plurality of valid characters for each of a plurality of languages;
- a plurality of tokens associated in the language character map with each of the plurality of languages;
- a part of speech associated in the language character map with each of the plurality of tokens;
- a translation of each of the plurality of tokens into at least one additional language in the language map.

9. The method of claim 8, further comprising at least one additional user interface control displaying an additional candidate domain name and displayed in response to the server computer modifying the user interface control to display the list of candidate domain names.

10. The method of claim 9, wherein the additional candidate domain name is translated into at least one additional language.

11. The method of claim 9, wherein the list of candidate domain names further comprises a transliteration of at least one character in the first language into at least one character in the second language.

12. The method of claim 7, wherein the list of candidate domain names further comprises a translation of the first token or the second token into a phonetic script.

* * * * *